United States Patent [19]
Embree et al.

[11] Patent Number: 5,370,070
[45] Date of Patent: Dec. 6, 1994

[54] NARROW PROFILE SOIL OPENING DEVICE FOR AGRICULTURAL MATERIAL PLACEMENT

[75] Inventors: Gary L. Embree; Robert A. Williams, both of Garden City, Kans.

[73] Assignee: Acra-Plant, Inc., Garden City, Kans.

[21] Appl. No.: 959,769

[22] Filed: Oct. 13, 1992

[51] Int. Cl.⁵ .................. A01B 49/04; A01B 15/00
[52] U.S. Cl. .................. 111/139; 111/125; 111/153; 172/772.5
[58] Field of Search .............. 111/139, 121, 125, 123, 111/156, 153; 172/772, 772.5; 37/141 R, 141 T, 142 R, 142 A

[56] References Cited
U.S. PATENT DOCUMENTS

| | | | |
|---|---|---|---|
| 1,680,031 | 8/1928 | White | 111/139 |
| 1,951,003 | 3/1934 | White | 111/139 |
| 2,842,078 | 7/1958 | Immesoete | 111/139 |
| 2,904,119 | 9/1959 | Hunter | 111/123 |
| 3,295,481 | 1/1967 | Dethmers | 111/125 |
| 4,598,654 | 7/1986 | Robertson et al. | |
| 4,719,862 | 1/1988 | Edmisson | 111/123 |
| 4,765,263 | 8/1988 | Wilkins | 111/123 |
| 5,159,985 | 11/1992 | Rowlett | 111/125 |
| 5,165,487 | 11/1992 | Williams et al. | 172/772.5 |

OTHER PUBLICATIONS

Acra-Plant sales brochure "New for '92 Residue/Fertility Management Systems" (IC3/91).

*Primary Examiner*—Clifford D. Crowder
*Assistant Examiner*—Michael A. Neas
*Attorney, Agent, or Firm*—Hovey, Williams, Timmons & Collins

[57] ABSTRACT

The placement device utilizes a flat, upright shank having a pair of rotatable residue cutting discs secured to opposite faces of the shank just outside of a slender, generally crescent shaped, replaceable insert component at the bottom of the shank which is only slightly wider than the shank itself. Instead of transverse fasteners which would widen the overall width of the assembly, a single draw bolt extends generally longitudinally of the shank and attaches the lower component to the lower end of the shank which is configured in the nature of a notch so as to complementally receive in edge-to-edge abutting relationship a matingly configured corner of the component.

16 Claims, 3 Drawing Sheets

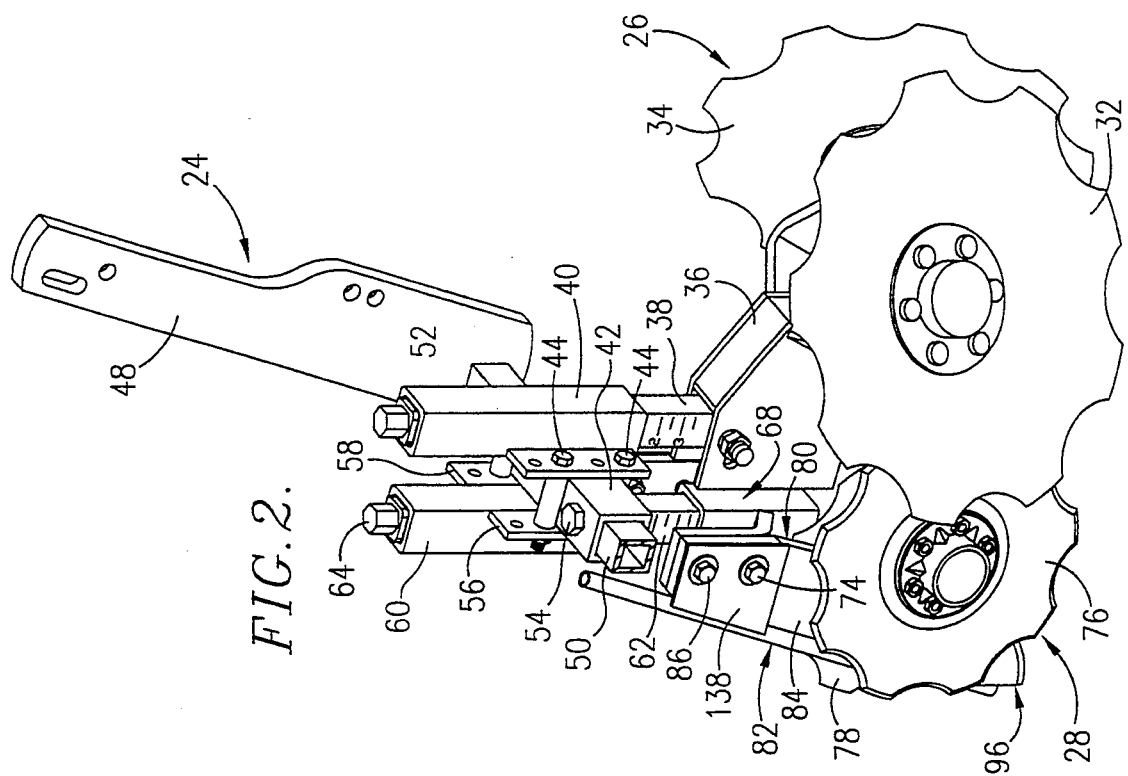
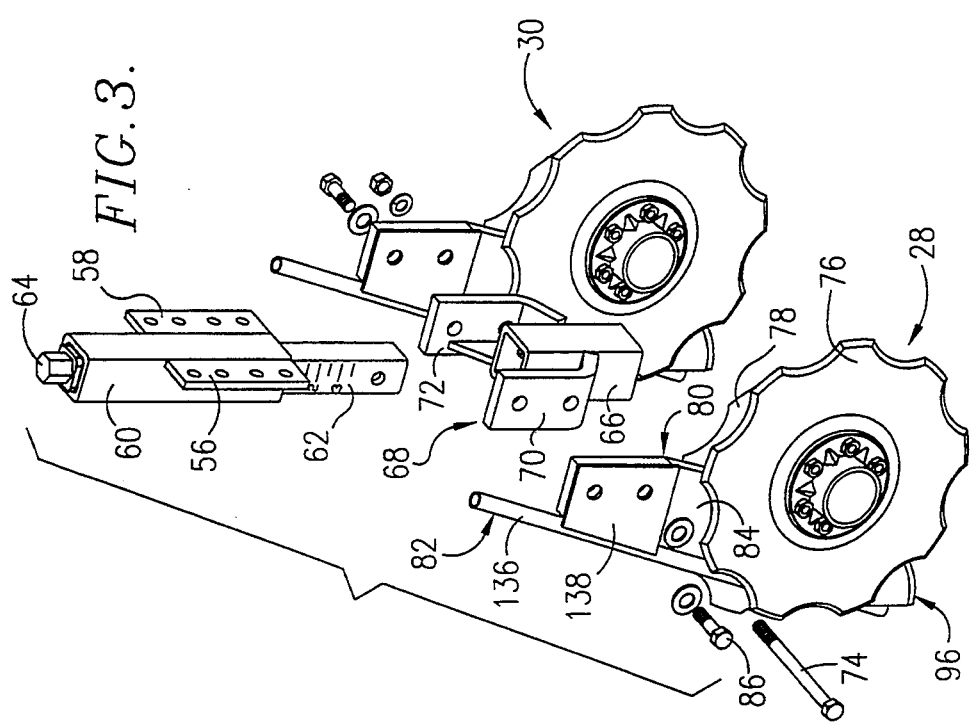

NARROW PROFILE SOIL OPENING DEVICE FOR AGRICULTURAL MATERIAL PLACEMENT

This invention relates generally to that type of farm equipment typically referred to as "planter attachments" and, more particularly, to a slim-line or narrow-profile attachment in front of a seed planter for adding nutrients or other substances to the soil through residue and trash left behind from the previous season.

BACKGROUND

While a number of devices have previously been commercially available to place fertilizer alongside seed rows as the seeds are being planted, the growing trend in agriculture of planting in fields where residue from last season's crop is either partially or totally left on the surface increases the need to effectively handle the residue that is encountered by the planting equipment during the seed placement operations. Stalks, leaves, and other heavy residue can quickly accumulate, clog and jam the planting mechanism if it is not effectively cleared to one side, cut through and/or allowed to release and pass through the various mechanisms associated with the planter.

SUMMARY OF THE PRESENT INVENTION

Accordingly, one important object of the present invention is to provide a device especially adapted for, but not necessarily limited to, use as a planter attachment which is of significantly improved, slim-line or narrow profile design to enable it to properly place its fertilizer or other substance into the soil while more effectively shedding and avoiding the buildup of trash residue encountered by the device in the vicinity of the seed bed. In carrying out this object, the present invention contemplates a new mounting arrangement for the replaceable metal "insert" or groove-forming component at the bottom of the shank associated with the device such that the shank is significantly more slender than in the past without sacrificing rigidity, ease of assembly, or functional performance. In this regard, the present invention also contemplates a new way of mounting the substance discharge tube on the shank to provide a reduced profile compared to prior units of this type.

More specifically, the present invention contemplates having the replaceable insert component attached to its mounting shank through means that lie totally within the plane or profile of the shank itself so that no additional width is imparted to the shank assembly by the attaching means which, in turn, necessarily allows trash cutting discs which flank the shank on opposite sides thereof to be situated closer together than in the past. The insert component is provided with an angularly configured top edge that is matingly received up into a notched lower portion of the shank. An inclined mounting bolt for the insert passes downwardly through the shank from the back edge to the mounting notch to draw the insert component up into tight, rigid abutment with the edge of the notch.

BRIEF DESCRIPTION OF THE DRAWINGS

FIG. 2 is a fragmentary, right front perspective view of the planter attachment removed from the planter, portions of the mounting structure being broken away and removed to reveal details of construction;

FIG. 3 is an exploded illustration of the two fertilizer placement devices of the attachment;

DETAILED DESCRIPTION

The placement device of the present invention is hereinafter described in connection with the application of fertilizer and other nutrients. However, it will be appreciated that there may be other beneficial uses of the placement device including, for example, seed placement itself, and therefore the description which follows should not be taken in a limiting sense, but rather only as being illustrative. Furthermore, the inventive device need not be utilized in combination with a planter, but may instead be used independently of such equipment. Still further, while a pair of such devices have been illustrated in the present disclosure, only one of such devices may be desired in any particular situation.

Figure 1:
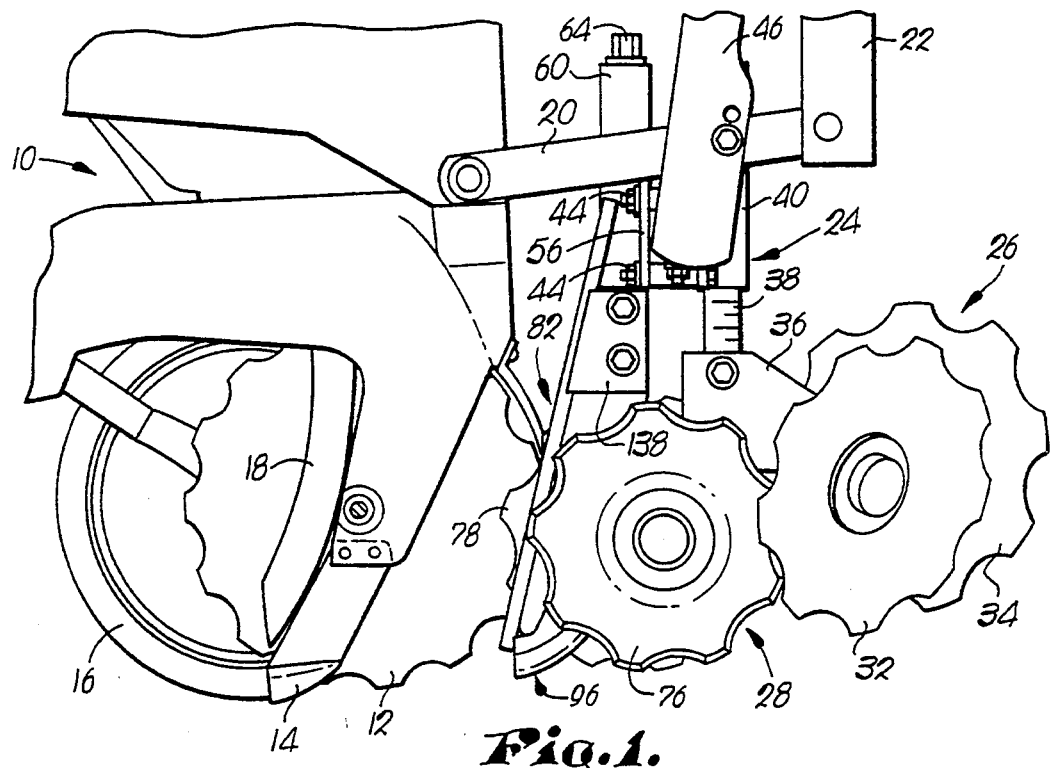
FIG. 1 is a fragmentary, right side perspective view of a planter provided with an attachment that includes one or more fertilizer placement devices in accordance with the principles of the present invention, the illustrated planter being of the double-disc opener type, with the near disc removed to reveal details of construction.

The planter 10 illustrated in FIG. 1 is of the double-disc opener type having a pair of side-by-side discs 12 (only one being shown) situated on opposite sides of a central, upright, groove shaping tool 14, as well understood by those skilled in the art. In the particular type planter selected for illustration, a depth gauging wheel 16 runs alongside of the discs 12 and shaping tool 14 to limit the depth of penetration of those devices. A seed tube 18 delivers a steady stream of seeds from a source of supply, not shown, for dropping the seeds in succession immediately behind the tool 14. Fore-and-aft parallel links 20 connect the planter unit 10 with mounting structure 22 associated with a transverse tool bar (not shown) to which a plurality of the units 10 are connected for pulling through the field.

In the illustrated embodiment, the planter 10 is provided with an attachment broadly denoted by the numeral 24 which includes a trash clearing device 26 and a pair of fertilizer placement devices 28 and 30 in accordance with the principles of the present invention (see FIG. 3 for the second placement device 30). The trash clearing device 26 chosen for purposes of illustration takes the form of a product sold by Acra-Plant, Inc., the assignee of the present invention, under the trade designation "Trash Whipper" and broadly includes a pair of ground-driven, downwardly and forwardly converging, fluted discs 32, 34 mounted on a common mount 36 that is secured to the lower end of a vertically adjustable stem 38. The stem 38 is telescopically received within an upright, square tube 40 that is fixedly secured to a square cross sleeve 42 by a plurality of bolts 44. The horizontal sleeve 42 comprises part of what may be termed a supporting platform for the trash clearing device 26 and the fertilizer placement devices 28, 30, the rest of such supporting platform comprising a pair of upright arms 46 and 48 (see FIGS. 1 and 2) which are secured to the parallel links 20 and which have respective, inwardly projecting, square stub tubes 50 and 52 at their lower ends projecting telescopically into the opposite open ends of the cross sleeve 42. Suitable retaining means such as the vertical bolt 54 shown in FIG. 2 lock the stub tubes 50, 52 within the cross sleeve 42 such that the supporting platform which comprises the arms 46, 48, stub tubes 50, 52, and cross sleeve 42 is rendered generally U-shaped in overall configuration.

The two placement devices 28 and 30 are secured to the back side of the cross sleeve 42 by the same bolts 44 used to attach the trash clearing device 26 to the front side of the cross sleeve 42. Such bolts 44 are secured to outwardly projecting flanges 56 and 58 on an upright square tube 60 that is part of the vertical adjustment means for the two placement devices 28 and 30. Such vertical adjustment means is similar to that provided on the front side of the sleeve 42 with respect to the trash clearing device 26 and includes an upright square stem 62 telescopically received within the tube 60 and moveable in its vertical adjusting position by means of an adjusting bolt 64 which is accessible from the top of the tube 60 and which is threadably engaged with the stem 62 within the interior of the tube 60.

Figure 5:
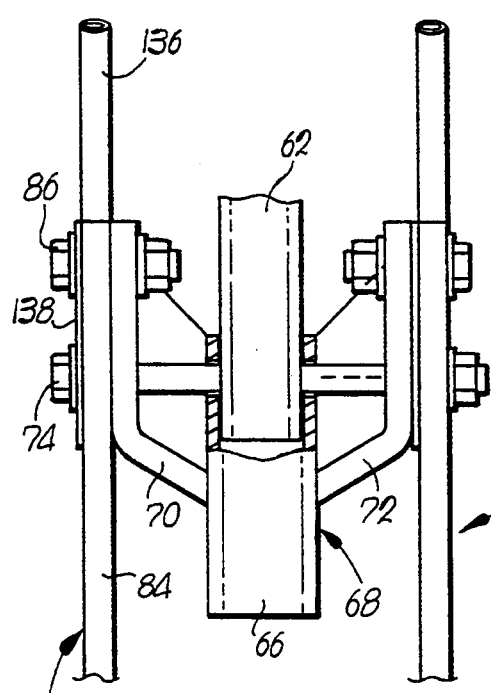
FIG. 5 is a fragmentary, front elevational view of the mounting bracket on which a pair of the placement devices are carried.
Figure 4:
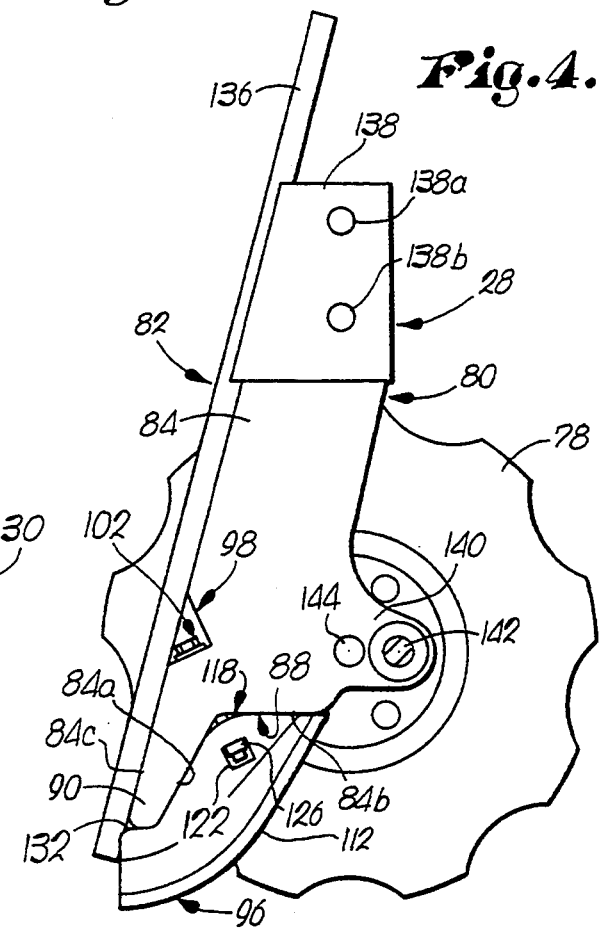
FIG. 4 is a side elevational view of one of the placement devices with the near trash-cutting disc removed to reveal details of construction.

As perhaps shown best in FIGS. 3 and 5, the stem 62 at its lower end fits into the upright, tubular hub 66 of a yoke 68 having a pair of outwardly and upwardly projecting support arms 70 and 72. The stem 62 is fixedly secured to the hub 66 by a long cross bolt 74 that also assists in securing the two placement devices 28 and 30 to the yoke 68 as will subsequently become apparent. Because the two placement devices 28 and 30 are both connected to the same yoke 68 via the two arms 70 and 72, they are adjusted up and down together when the bolt 64 is rotated. It will be appreciated that the yoke 68 is located on the centerline of the planter such that the two placement devices 28 and 30 are disposed on opposite sides of the seed row formed by the double discs 12 and the groove-shaping 14 tool of the planter.

The two placement devices 28 and 30 are identical to one another. Therefore, only the placement device 28 will be described in detail, with particular reference being made to FIGS. 4-9. The placement device 28 broadly consists of three major parts, i.e., a pair of trash cutting discs 76, 78, an upright opener assembly 80 that opens a groove in the soil, and a delivery tube assembly 82 that places the fertilizer into the groove formed by the opener assembly 80. Dealing first with the opener assembly 80, it will be seen that such structure includes a main supporting shank 84 fabricated from a flat metal plate and oriented in such a way that the opposite flat sides of the plate define the lateral sides of the shank while the narrower opposite edges of the plate define the front and rear extremities of the shank. As noted particularly in FIG. 5, the upper end of the shank 84 lies flatly alongside of and against the arm 70 of the yoke 68 and is secured thereto by the bolt 74 and also by a separate, shorter bolt 86.

The shank 84 is notched out at its lower end to present a forwardly and downwardly facing notch 88 formed from intersecting edge portions 84a and 84b of the shank 84. As noted particularly in FIGS. 4 and 6, the edge portions 84a and 84b intersect one another at an obtuse angle, with the portion 84a projecting downwardly and rearwardly at an incline and the portion 84b projecting fore-and-aft in a substantially horizontal condition. As a result of the notch 88 in the shank 84, a downwardly and rearwardly projecting toe 90 is defined at the lower rear extremity of the shank 84 by the edge portion 84a on the one hand and the trailing edge portion 84c of the shank on the other hand. A pair of locating pins 92 and 94 (FIG. 6) are embedded in the edge portions 84a and 84b and project outwardly therefrom into the notch area 88 for use in properly locating a replaceable, groove-forming metal insert component 96 on the shank 84, as will subsequently be made clear.

Figure 6:
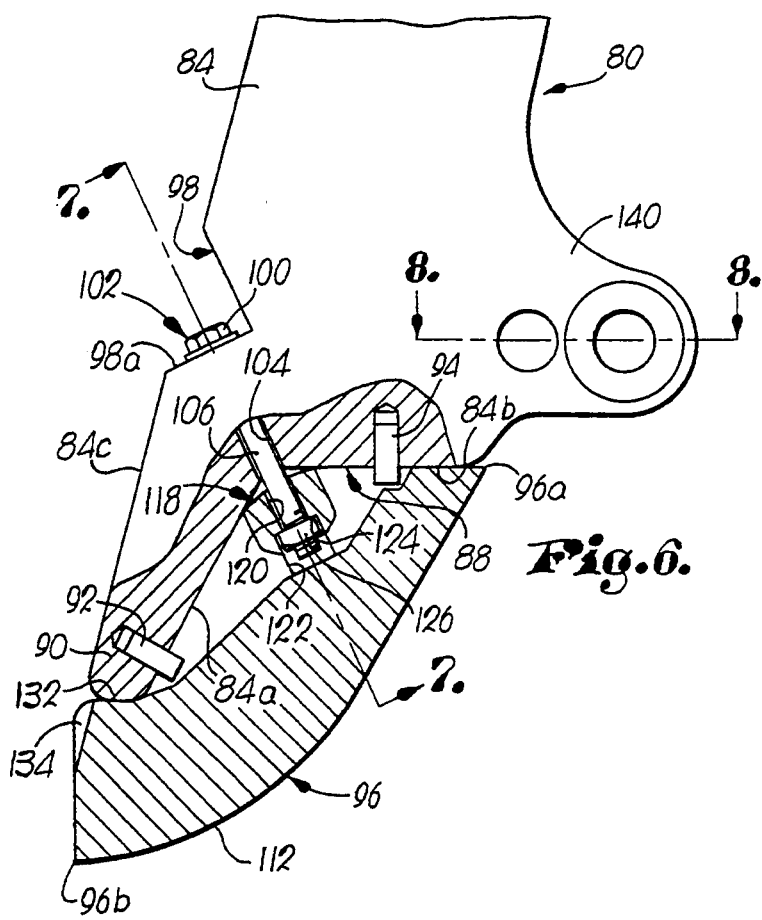
FIG. 6 is a fragmentary, enlarged elevational view of the lower end of the opener of the placement device with the trash cutting discs removed and portions of the insert component and surrounding structure broken away and shown in cross-section for clarity.
Figure 7:
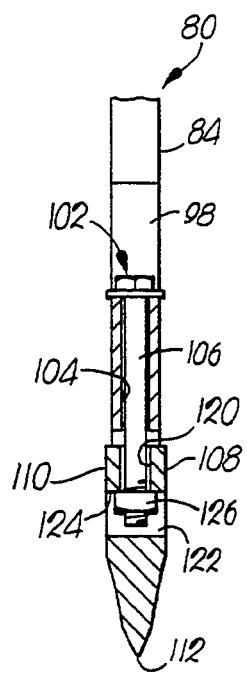
FIG. 7 is a fragmentary cross-sectional view through the lower end of the opener taken substantially along line 7—7 of FIG. 6.
Figure 9:
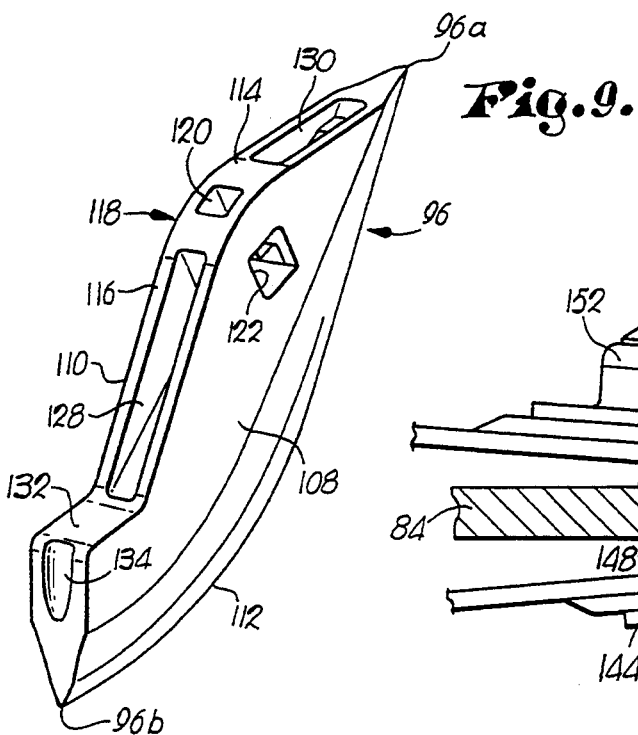
FIG. 9 is a right rear perspective view of the groove-forming insert component itself.
Figure 8:
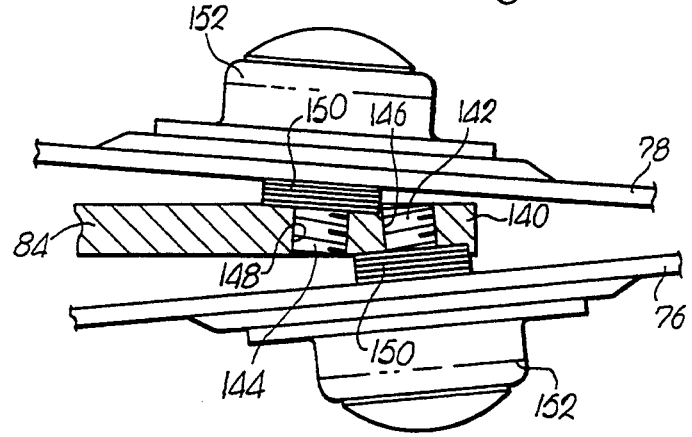
FIG. 8 is a fragmentary, horizontal cross-sectional view through the opener with the trash cutting discs in place and taken substantially along line 8—8 of FIG. 6.

The shank 84 also has an angular notch or indentation 98 in its trailing edge 84c located slightly above the notch 88. The indentation 98 presents a downwardly and rearwardly sloping shelf 98a that serves as a retaining shoulder or stop for the head 100 of a fastening bolt 102 used to releaseably secure the insert component 96 to the shank 84. An inclined bore 104 through the shank 84 slopes downwardly and forwardly from the shelf 98a at right angles thereto and exits at the notch 88 at the point of intersection between the edge portions 84a and 84b thereof. It will be seen that the bore 104 extends generally longitudinally of the shank 84, as opposed to transversely thereof, and lies entirely within the plane of the shank 84, with its longitudinal axis bisecting the angle formed by the intersecting edge portions 84a and 84b of the notch 88. As illustrated in FIGS. 6 and 7, the bore 104 receives the shank 106 of the bolt 102, which shank 106 projects into the notch 88 for a significant distance beyond the lower end of bore 104.

The insert component 96 comprises a generally flat, generally crescent-shaped metal body having a pair of opposite flat sides 108 and 110 that taper and converge to a continuous leading, convex, narrow edge 112 which extends continuously from the upper front extremity 96a of the body to the lower rear terminus 96b thereof. The opposite mounting edge of the component 96 is generally matingly configured with respect to the notch 88 of the shank 84 so as to present a pair of intersecting edge surface portions 114 and 116 that converge to present an outside corner broadly denoted by the numeral 118. Although the corner 118 on the component 96 is rounded at the point of intersection of the edge portions 114 and 116, it still corresponds substantially to the configuration of the notch 88 such that corner 118 becomes nested securely within the notch 88 when the component 96 is secured to the shank 84 in the manner illustrated particularly in FIGS. 4 and 6.

The component 96 is provided with an inclined hole 120 at the intersection of the edge surface portions 114, 116 which extends inwardly from such intersection along an axis which bisects the angle defined by the corner 118. Furthermore, the hole 120 is so positioned as to be aligned with the clearance bore 104 within shank 84 when the component 96 is properly seated within the notch 88 such that the hole 120 may receive the shank 106 of the bolt 102 in the manner illustrated in FIGS. 6 and 7.

The component 96 is also provided with a transverse access opening 122 which passes through the component 96 from side-to-side thereof and intersects the hole 120. The opening 122 is of slightly larger dimension than the hole 120 such that an internal shoulder 124 is defined at the intersection of the hole 120 and the opening 122. The shoulder 124 serves as a surface against which a nut 126 on the threaded lower end of the bolt shank 106 may bear in order to draw the component 96 tightly up into the notch 88. The access opening 122 is of rectangular cross-sectional configuration and the walls of the latter are located in relatively close proximity to the nut 126 so that such walls serve to prevent rotation of the nut 126 during tightening of the bolt 102 by rotation of the shank 106 thereof. Elongated locating slots 128 and 130 in the top mounting edge of the component 96 receive the respective locating pins 92 and 94 of the shank 84 to help position the component 96 properly within the notch 88.

The component 96 is also configured along its upper edge to present a step surface 132 that extends generally parallel with the edge surface portion 114 and abuttingly engages the toe 90 of the shank 84 when the component 96 is drawn tightly up against the shank 84 by the bolt 102. A recess 134 is formed in an upright rearmost extremity of the component 96, which extremity extends between the lower termination 96b of creasing edge 112 and the step surface 132. Preferably, the component 96 is constructed from an abrasion-resistant cast iron which falls within ASTM specification A532, Class II, Type E. A preferred composition of the abrasion-resistant cast iron includes: Chrome 19.0–21.0%; Carbon 3.10–3.30%; Silicon 0.60–0.70%; Manganese 0.65–0.80%; Molybdenum 0.95–1.15%; Sulfur less than 0.03%; Phosphorus less than 0.05%. Castings made in accordance with the foregoing composition are cooled in the mold until reaching 200° F. or less.

The delivery tube assembly 82 includes a long, straight metal tube 136 of circular cross-sectional configuration which is no wider than the shank 84 and which lies flatly up against and extends along the trailing edge 84c thereof. The lower termination of the tube 136 fits complementally into the recess 134, while the opposite upper end thereof extends upwardly beyond the upper end of the shank 84. The assembly 82 also includes a flat mounting plate 138 adjacent the upper end of the tube 136 which is fixed to the latter and projects forwardly therefrom into position alongside the outer face of the shank 84. A pair of mounting holes 138a and 138b in the plate 130 provide clearance for the respective bolts 86 and 74 for the purpose of providing means of attaching the tube 136 to the shank 84.

The two trash cutting discs 76 and 78 are attached to the shank 84 at a forwardly projecting nose 140 located slightly above the notch 88 and at approximately the same horizontal level as the indentation 98. The two discs 76 and 78 are preferably of the flat blade, fluted periphery type, as well known by those skilled in the art, so as to provide a clean and sharp cutting action as they roll along the ground in contacting engagement with the surface residue. As illustrated particularly in FIGS. 4 and 8, the discs 76, 78 have respective threaded shanks 142 and 144 which are threadably received by slightly fore-and-aft spaced respective cross bores 146 and 148 in the nose 140 of shank 84. The cross bores 146 and 148 are arranged at such angles that the discs 76 and 78 are caused to converge downwardly and forwardly. In the illustrated embodiment, each of the discs 76, 78 is provided with a stack of spacer shims 150 that space the respective bodies of the discs 76, 78 outwardly from the opposite sides of the shank 84, each of the discs 76 and 78 also having internal bearing assemblies (not shown) housed interiorly of their respective hubs 152.

OPERATION

In use, it is believed apparent that the fertilizer placement devices 28 and 30 will move through a largely cleared path left by the trash clearing device 26 and place bands or ribbons of fertilizer on opposite sides of the seed row being deposited by the planter 10. Due to the fact that the replaceable insert component 96 is only slightly thicker than the shank plate 84 itself, the two trash cutting discs 76, 78 of each placement device 28 and 30 can be closer together than what would otherwise be the case so as to present a more narrow profile than would otherwise be possible. Such narrow spacing of the two discs 76 and 78 is also possible because the fastener bolt 102 lies totally within the plane of the shank plate 84 and extends generally longitudinally thereof as opposed to extending in a transverse or crosswise direction, as has heretofore been the practice. Thus, the fastener bolt 102 adds no additional width to the shank 84 or the insert component 96. And because of the mating orientations of the notch 88 on the shank 84 and the corner 118 on the component 96, loading forces generated by the component 96 as it travels through the ground are transmitted to the shank 84 in a desired manner. Note further that only a single bolt 102 is necessary in order to securely attach the component 96 to the shank 84, particularly as a result of the nested, mating relationship of the component corner 118 and the shank notch 88. In the event replacement of the component 96 is desired, it is a simple measure to detach the tube assembly 82 so as to expose the bolt 102 for loosening of the latter so as to release the currently installed 96 from the shank 84.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In an agricultural device for placing substances in the soil and having a pair of side-by-side, downwardly and forwardly converging discs rotatably disposed on opposite sides of an opener assembly located between said discs, said opener assembly including an upright, elongated shank and a replaceable lowermost, groove-forming component attached to the lower end of the shank, the improvement comprising:

said shank having a lower mounting edge, said component having an upper mounting surface; and releasable fastening means extending generally lengthwise of the shank for detachably securing the component to the shank with said upper surface of the component abutted against said lower edge of the shank, said lower edge of the shank including a pair of angularly disposed edge portions arranged to receive thrust loads in different directions from the component during groove-forming movement of the component through the soil, one of said edge portions lying at least partially in a normally horizontal plane for preventing upward movement of the component relative to the shank and the other of said edge portions lying at least partially in a normally vertical plane for preventing rearward movement of the component relative to the shank, said pair of edge portions converging toward one another to present a normally downwardly and forwardly facing notch, said upper surface of the component including a pair of surface portions that converge to a normally upwardly and rearwardly facing corner matingly received within said notch, said component being generally crescent-shaped and having a convex cutting edge extending below said notch and intersecting the longitudinal axis of the shank.

2. In an agricultural device as claimed in claim 1, said shank having a bore extending therethrough in a lengthwise direction relative to the longitudinal axis of the shank, said fastener means including a releasable element extending through said bore and into retaining engagement with said component for drawing the component up against the shank.

3. In an agricultural device as claimed in claim 1, said shank having a generally axially extending bore therethrough at the intersection of said converging edge portions in the notch, said fastening means including an element passing through the bore and into connecting engagement with the component for drawing the same tightly into the notch.

4. In an agricultural device as claimed in claim 3, said bore having an axis which substantially bisects the angle of intersection defined by the converging edge portions of the notch.

5. In an agricultural device as claimed in claim 1, said shank comprising a flat plate having a forwardly projecting nose located above said lower mounting edge, said nose being provided with a pair of fore-and-aft spaced, transversely extending, threaded bores for supporting said discs about slightly forwardly offset axes of rotation.

6. In an agricultural device as claimed in claim 1, said shank comprising a flat plate including a pair of opposite, flat sides and an upright trailing edge, said opener assembly further including an upright dispensing tube lying along said trailing edge and having a lowermost discharge end adjacent said groove-forming component, said tube having a mounting plate fixed thereto and disposed in overlapping relationship with one of said flat sides of the shank, said mounting plate having releasable retaining means securing the mounting plate to the one side of the shank whereby to releasably attach the tube to the shank.

7. In an agricultural device for placing substances in the soil and having a pair of side-by-side, downwardly and forwardly converging discs rotatably disposed on opposite sides of an opener assembly located between said discs, said opener assembly including an upright, elongated shank and a replaceable lowermost, groove-forming component attached to the lower end of the shank, the improvement comprising:

said shank having a lower mounting edge, said component having an upper mounting surface; and releasable fastening means extending generally lengthwise of the shank for detachably securing the component to the shank with said upper surface of the component abutted against said lower edge of the shank, said lower edge of the shank including a pair of angularly disposed edge portions arranged to receive thrust loads in different directions from the component during groove-forming movement of the component through the soil, one of said edge portions lying at least partially in a normally horizontal plane for preventing upward movement of the component relative to the shank and the other of said edge portions lying at least partially in a normally vertical plane for preventing rearward movement of the component relative to the shank, said pair of edge portions converging toward one another to present a normally downwardly and forwardly facing notch, said upper surface of the component including a pair of surface portions that converge to a normally upwardly and rearwardly facing corner matingly received within said notch, said shank having a generally axially extending bore therethrough at the intersection of said converging edge portions in the notch, said fastening means including an element passing through the bore and into connecting engagement with the component for drawing the same tightly into the notch, said bore having an axis which substantially bisects the angle of intersection defined by the converging edge portions of the notch, said component having a clearance hole at said corner which projects in a direction substantially bisecting the angle defined by the intersecting surface portions of the component and which is disposed to receive said element of the fastening means when the component is attached to said shank, said component further having a transverse access opening which intersects said clearance hole, said element of the fastening means including a threaded end portion normally disposed in said access opening when the component is attached to the shank, and said fastening means further including a nut threaded onto said end portion of the element in said access opening.

8. In an agricultural device as claimed in claim 7, said edge portions of the notch each including a locating projection extending outwardly from the respective edge portion, said surface portions of the component including mating apertures for receiving said locating projections of the shank.

9. In an agricultural device as claimed in claim 8, said shank having a generally upright, trailing edge provided with an indentation defined in part by an inclined shelf disposed at right angles to the axis of said bore, said element of the fastening means having a head which bears against said shelf.

10. In an agricultural device for placing substances in the soil and having a pair of side-by-side, downwardly and forwardly converging discs rotatably disposed on opposite sides of an opener assembly located between said discs, said opener assembly including an upright, elongated shank and a replaceable lowermost, groove-forming component attached to the lower end of the shank, the improvement comprising:

said shank having a lower mounting edge, said component having an upper mounting surface; and releasable fastening means extending generally lengthwise of the shank for detachably securing the component to the shank with said upper surface of the component abutted against said lower edge of the shank, said shank having a bore extending therethrough in a lengthwise direction relative to the longitudinal axis of the shank, said fastener means including a releasable element extending through said bore and into retaining engagement with said component for drawing the component up against the shank, said component having a clearance hole which is axially aligned with said bore and which is disposed to receive said element of the fastening means when the component is attached to said shank, said component further having a transverse access opening which intersects said clearance hole, said element of the fastening means including a threaded end portion normally disposed in said access opening when the component is attached to the shank, and said fastening means further including a nut threaded onto said end portion of the element in said access opening.

11. In an agricultural device as claimed in claim 10, said shank having a generally upright, trailing edge provided with an indentation defined in part by an inclined shelf disposed at right angles to the axis of said bore, said element of the fastening means having a head which bears against said shelf.

12. A replaceable ground-engaging component for attachment to the lower end of a normally upright shank, said component comprising:

a generally flat, generally crescent-shaped metal body having a pair of opposite sides that converge to a narrow, leading, groove-forming convex edge that extends continuously from a normally uppermost and forwardmost extremity to a lowermost and rearwardmost termination, said body having an opposite mounting edge spaced from said groove-forming edge that is substantially thicker than the groove-forming edge to present a flat mounting surface which abuts the shank when the component is attached to the shank, said mounting surface including a pair of elongated surface portions which converge toward one another to present a corner on the body opposite to the groove-forming edge and adapted to be matingly received by the shank, said body being provided with structure adapted to cooperate with means for releasably securing the component to the shank, said structure including an elongated clearance hole extending inwardly from said mounting edge at said corner and a transverse access opening intersecting said clearance hole, there being a shoulder formed at the intersection of said access opening and said clearance hole for use in drawing the component up against the shank with the releasable securing means.

13. A replaceable ground-engaging component as claimed in claim 12, each of said surface portions having an inwardly extending locating aperture for receiving a corresponding locating projection on the shank.

14. A replaceable ground-engaging component for attachment to the lower end of a normally upright shank, said component comprising:

a generally flat, generally crescent-shaped metal body having a pair of opposite sides that converge to a narrow, leading, groove-forming convex edge that extends continuously from a normally uppermost and forwardmost extremity to a lowermost and rearwardmost termination, said body having an opposite mounting edge spaced from said groove-forming edge that is substantially thicker than the groove-forming edge to present a flat mounting surface which abuts the shank when the component is attached to the shank, said mounting surface including a pair of elongated surface portions which converge toward one another to present a corner on the body opposite to the groove-forming edge and adapted to be matingly received by the shank, said body being provided with structure adapted to cooperate with means for releasably securing the component to the shank, said mounting edge further including a rearmost step portion projecting rearwardly from a normally inclined one of said surface portions and extending generally parallel to the other of the surface portions.

15. A replaceable ground-engaging component as claimed in claim 14, said body having a normally upright, trailing rear face extending between the termination of the leading edge of the body and said step portion of the mounting edge.

16. A replaceable ground-engaging component as claimed in claim 15, said trailing rear face of the body having a dished recess therein for complementally receiving the exterior of a discharge tube associated with the opener.

* * * * *